(12) United States Patent
Kim et al.

(10) Patent No.: US 10,060,648 B2
(45) Date of Patent: Aug. 28, 2018

(54) AIR CONDITIONER AND METHOD OF OPERATING THE SAME

(71) Applicant: LG ELECTRONICS INC., Seoul (KR)

(72) Inventors: Seungyup Kim, Seoul (KR); Daehee Kim, Seoul (KR); Dongsoo Lee, Seoul (KR); Jangwoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/232,571

(22) Filed: Aug. 9, 2016

(65) Prior Publication Data

US 2017/0045261 A1 Feb. 16, 2017

(30) Foreign Application Priority Data

Aug. 11, 2015 (KR) .......................... 10-2015-0113423

(51) Int. Cl.
| | |
|---|---|
| *F24F 13/24* | (2006.01) |
| *F25B 49/02* | (2006.01) |
| *F24F 1/40* | (2011.01) |
| *F24F 1/12* | (2011.01) |
| *G05B 19/042* | (2006.01) |
| *F24F 11/30* | (2018.01) |

(Continued)

(52) U.S. Cl.
CPC ................ *F24F 13/24* (2013.01); *F24F 1/12* (2013.01); *F24F 1/40* (2013.01); *F24F 11/30* (2018.01);
(Continued)

(58) Field of Classification Search
None
See application file for complete search history.

(56) References Cited

U.S. PATENT DOCUMENTS 4,784,319 A * 11/1988 Kaiser ................ G05D 23/1902
165/11.1
5,010,739 A * 4/1991 Isshiki .................. F04D 27/004
181/175

(Continued)

FOREIGN PATENT DOCUMENTS

| EP | 03036448 | 2/1991 |
|---|---|---|
| EP | 2009361 A1 | 12/2008 |

(Continued)

OTHER PUBLICATIONS

Air-Conditioning, Heating, and Refrigeration Institute, AHRI Standard 885, 2008 [retrieved on Nov. 21, 2017] Retrieved from the Internet: <URL: https://www.krueger-hvac.com/files/white%20papers/white_paper_885.pdf>.*

(Continued)

*Primary Examiner* — Kenneth M Lo
*Assistant Examiner* — Istiaque Ahmed
(74) *Attorney, Agent, or Firm* — Dentons US LLP

(57) ABSTRACT

An conditioner including a compressor that compresses refrigerant, an outdoor unit fan that blows out the air heat-exchanged by an outdoor heat exchanger, a noise sensor that measures noise, a data part that saves noise data measured by the noise sensor, a control part that performs a low noise operation by distinguishing between ambient noise and noise made by the air conditioner based on noise measurements from the noise sensor, wherein the control part sets a target noise level according to the ambient noise, changes the operational settings of the compressor and outdoor unit fan, and controls the operation to ensure that the noise from the air conditioner does not exceed an environmental noise regulatory value.

18 Claims, 9 Drawing Sheets

(51) Int. Cl.
*F24F 11/77* (2018.01)
*F24F 110/10* (2018.01)
*F24F 130/40* (2018.01)
*F24F 11/84* (2018.01)
*F24F 11/85* (2018.01)

(52) U.S. Cl.
CPC ............ *F24F 11/77* (2018.01); *F25B 49/022* (2013.01); *G05B 19/042* (2013.01); *F24F 11/84* (2018.01); *F24F 11/85* (2018.01); *F24F 2013/247* (2013.01); *F24F 2110/10* (2018.01); *F24F 2130/40* (2018.01); *F25B 2313/0294* (2013.01); *F25B 2500/12* (2013.01); *G05B 2219/2614* (2013.01); *Y02B 30/746* (2013.01)

(56) References Cited

U.S. PATENT DOCUMENTS

2001/0029413 A1* 10/2001 Haas ................ G01M 15/00
701/29.7
2005/0223725 A1* 10/2005 Crane .................... F25B 49/02
62/183
2009/0091441 A1* 4/2009 Schweitzer, III ... G01M 13/028
340/531

FOREIGN PATENT DOCUMENTS

| | | |
|---|---|---|
| GB | 2236200 A | 3/1991 |
| JP | 2600538 B2 | 4/1997 |
| KR | 10-1993-0006879 B1 | 7/1993 |
| KR | 10-2014-0094342 A | 7/2014 |
| WO | 2005/100883 A1 | 10/2005 |

OTHER PUBLICATIONS

Municipal Code of Chicago, Article XXI. Environmental Noise and Vibration Control, American Legal Publishing Corporation, Sep. 8, 2010, [retrieved on Nov. 21, 2017] Retrieved from the Internet: <URL: https://www.cityofchicago.org/dam/city/depts/doe/general/PermittingAndEnforcement_PDFs/NoiseOrdinance/NoiseOrdinance2011.pdf>.*

* cited by examiner

AIR CONDITIONER AND METHOD OF OPERATING THE SAME

CROSS-REFERENCE TO RELATED APPLICATION

The application claims priority under 35 U.S.C. § 119 and 35 U.S.C. § 365 to Korean Patent Application No. 10-2015-0113423, filed on Aug. 11, 2015, whose entire disclosure is hereby incorporated by reference.

BACKGROUND OF THE INVENTION

1. Field of the Invention

An air conditioner and method of operating the same, and more particularly, an air conditioner that controls an operation according to ambient noise and a method of operating the same.

2. Discussion of the Related Art

Air conditioners regulate an indoor temperature and purify indoor air by blowing cold or warm air in a room, with the purpose of providing a more comfortable environment. Typically, an air conditioner includes an indoor unit consisting of a heat exchanger, and an outdoor unit consisting of a compressor and a heat exchanger for supplying refrigerant to the indoor unit.

This air conditioner is controlled separately for the indoor unit and the outdoor unit, and operates by controlling the power supply to the compressor or to the heat exchanger. Also, at least one indoor unit may be connected to the outdoor unit, and refrigerant is supplied to the indoor unit to operate the air conditioner in a cooling mode or a heating mode depending.

In the air conditioner, the outdoor unit and the indoor unit are connected to a refrigerant pipe, and refrigerant compressed by the compressor of the outdoor unit is supplied to the heat exchanger of the indoor unit, heat-exchanged in the heat exchanger of the indoor unit, and then drawn into the compressor of the outdoor unit via the refrigerant pipe. Accordingly, cold and warm air is blown into the room by heat transfer using refrigerant.

During operation of the outdoor unit, the air conditioner makes noise from operating the outdoor unit fan as well as the compressor. This is problematic, especially at night.

Conventionally, night-time low noise operation is performed after a certain period of time after the temperature peak, with the goal of reducing noise by decreasing the rotation speed of the outdoor unit fan. But, the nighttime low noise operation has little noise reduction effect since it only adjusts the speed of the outdoor unit fan. Moreover, the outdoor unit fan runs regardless of the surroundings since the operational settings are based only on the peak temperature, and it can be adapted for cooling operation only, but not for heating operation.

The present invention provides a solution for performing low noise operation according to the surroundings regardless of the operation mode.

SUMMARY OF THE INVENTION

An aspect of the present disclosure is to provide an air conditioner which performs operation by reducing noise regardless of time or operation mode, and which performs low noise operation efficiently by controlling operation according to the surroundings, and a method of operating the same.

An exemplary embodiment of the present invention provides an air conditioner including a compressor that compresses refrigerant, an outdoor unit fan that blows out the air heat-exchanged by an outdoor heat exchanger, a noise sensor that measures noise, a data part that saves noise data measured by the noise sensor, a control part that performs a low noise operation by distinguishing between ambient noise and noise made by the air conditioner based on noise measurements from the noise sensor, wherein the control part sets a target noise level according to the ambient noise, changes the operational settings of the compressor and outdoor unit fan, and controls the operation to ensure that the noise from the air conditioner does not exceed an environmental noise regulatory value.

An exemplary embodiment of the present invention provides a method of operating an air conditioner having an indoor unit and an outdoor unit, the method including measuring, by a noise sensor, noise when an operation mode of the outdoor unit is set to a low noise mode, detecting, by a control part, ambient noise from the measured noise and setting a target noise level according to the ambient noise, configuring, by the control part, the operational settings of a compressor or an outdoor unit fan based on the target noise level, measuring, by the noise sensor, noise during operation of the outdoor unit after the operational settings of the compressor or the outdoor unit fan have been configured, determining, by the control part, whether the measured noise is at a low level lower than an environmental noise regulatory value, determining, by the control part, whether the discharge temperature of an indoor unit meets a set value, and changing, by the control part, the operational settings of the compressor or the outdoor unit fan when the noise from the outdoor unit is not at a low level or the discharge temperature of the indoor unit does not meet the set value.

Thus, the air conditioner and the method of operating the same according to the present invention can reduce noise generated from the air conditioner by controlling the operating frequency of the compressor or the rotation speed of the outdoor unit fan in performing low noise operation, allow for more efficient low noise operation by detecting ambient noise around the air conditioner and controlling the operation of the air conditioner according to the ambient noise level, and offer a more pleasant environment by eliminating the user's discomfort from noise.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
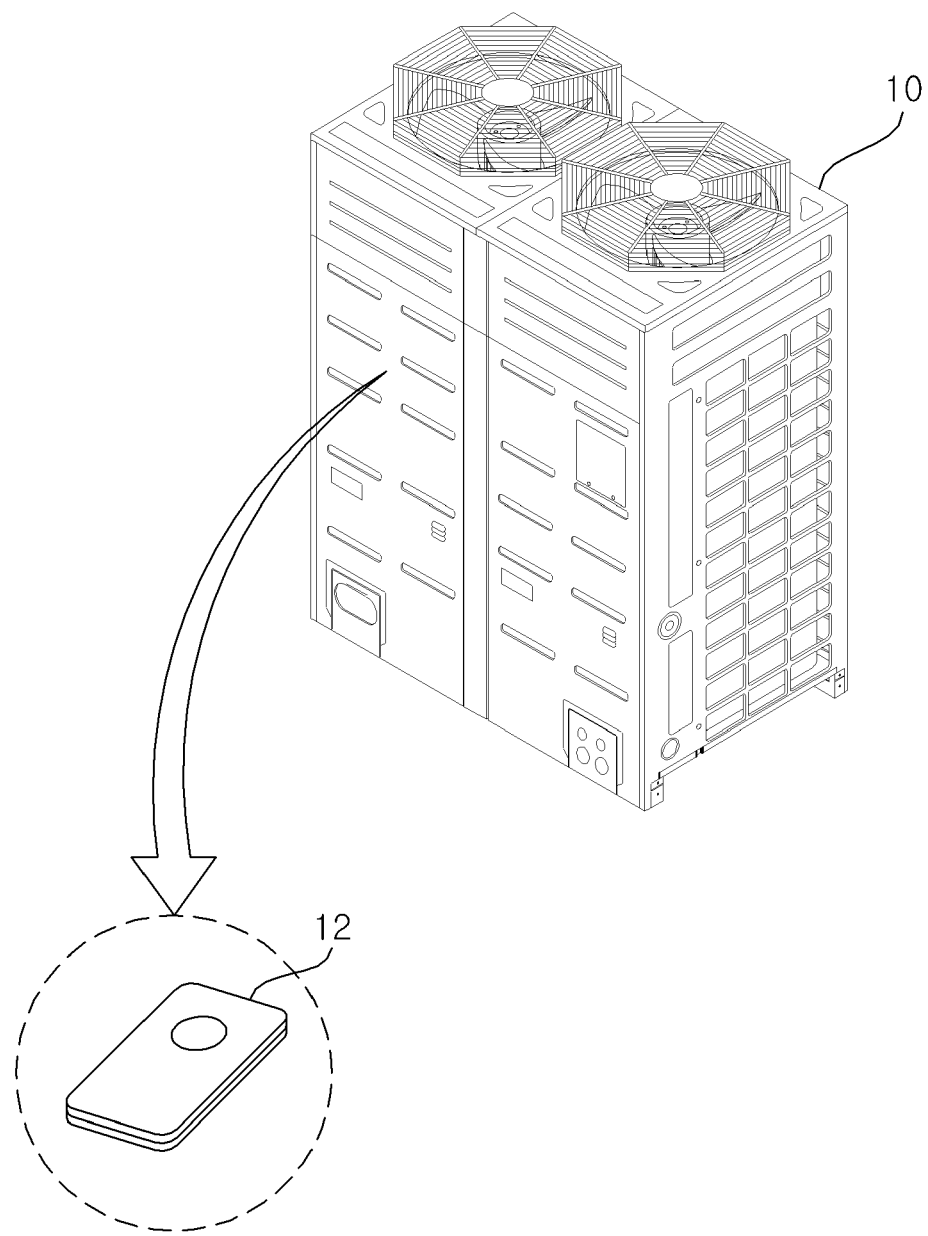
FIG. 1 is a view schematically illustrating the configuration of an air conditioner according to the present disclosure.

Advantages and features of the present disclosure and methods of accomplishing the same will be apparent by referring to the embodiments described below in detail in connection with the accompanying drawings. However, the present disclosure is not limited to the embodiments disclosed below and may be implemented in various different forms. The embodiments are provided only for completing the disclosure of the present disclosure and for fully representing the scope of the present disclosure to those skilled in the art. Like reference numerals refer to like elements throughout the specification.

Hereinafter, an exemplary embodiment of the present disclosure will be described in detail with reference to the drawings.

Figure 2:
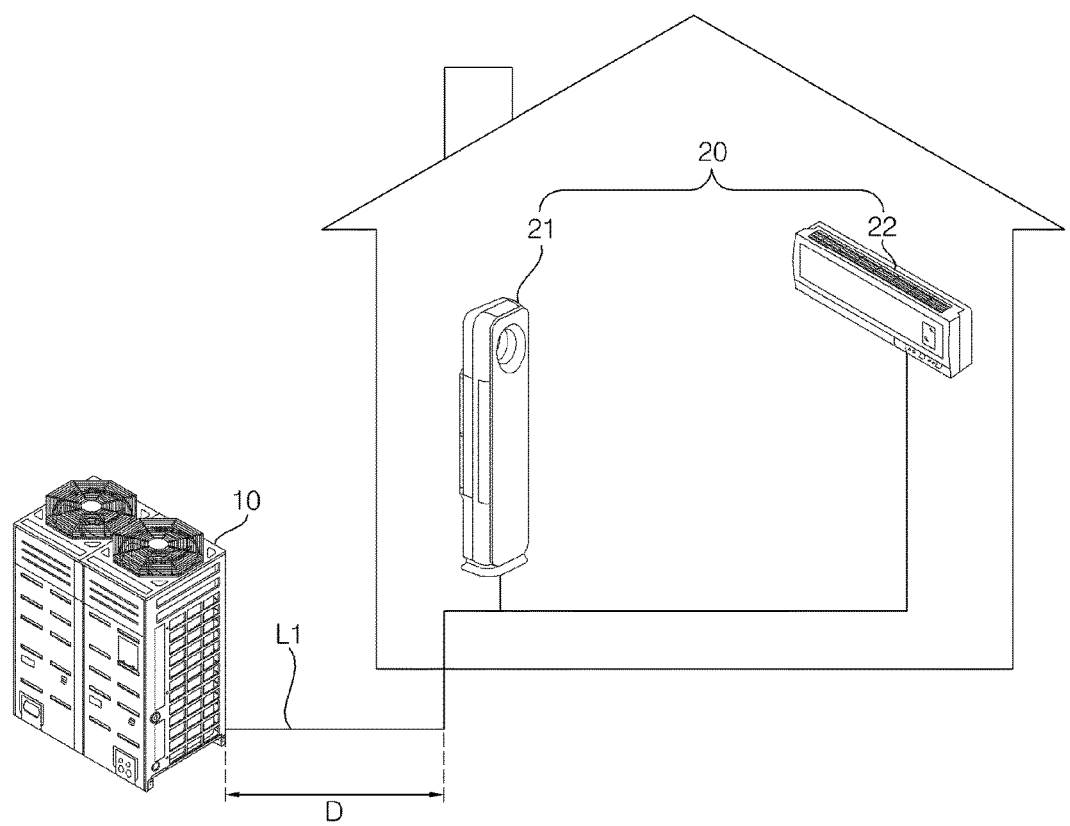
FIG. 2 is a view illustrating an example of the configuration of an outdoor unit and indoor units and of the placement distance between them, in an air conditioner according to the present disclosure.

FIG. 1 is a view schematically illustrating the configuration of an air conditioner according to an embodiment of the present disclosure. FIG. 2 is a view illustrating an example of the configuration of an outdoor unit and indoor units and of the placement distance, in an air conditioner according to an embodiment of the present disclosure.

Referring to FIGS. 1 and 2, an air conditioner may include indoor units 21 and 22 and an outdoor unit 10. The indoor units 21 and 22 may collectively be referred to as an indoor unit 20. The invention is not limited to any particular number of indoor and outdoor units.

The air conditioner may include a remote control (not shown) that communicates with the indoor units 21 and 22 in a wired or wireless manner, transmits input data to the indoor units, and displays the operating status of the air conditioner, and a remote controller (not shown) that is connected to the indoor units and the outdoor unit 10 and monitors and controls their operations.

The air conditioner may be categorized as a ceiling-mounted, floor-standing, or wall-mounted air conditioner, depending on the installation position, and the numbers of indoor units and outdoor units are not limited to those depicted in the drawings. The air conditioner may further include other units, such as a ventilation unit, an air freshener unit, a humidifying unit, dehumidification unit, and a heater, in addition to the outdoor unit and the indoor units, but for purposes of convenience, description of those units will be omitted below.

In the air conditioner, the indoor units 21 and 22 and the outdoor unit 10 are connected to a refrigerant pipe L1. Refrigerant blown out from the outdoor unit 10 may be supplied to the indoor units 21 and 22 via the refrigerant pipe L1, and then drawn into the outdoor unit 10 from the indoor units 21 and 22.

The indoor units 21 and 22 and the outdoor unit 10 communicate with one another according to a predetermined communication method. For example, a plurality of units may be connected by a communication line, or communicate with one another using power lines or via the refrigerant pipe.

The indoor units 21 and 22 each may include an expansion valve (not shown) for expanding the refrigerant supplied from the outdoor unit 10, an indoor heat exchanger (not shown) for exchanging heat with the refrigerant, an indoor unit fan (not shown) for letting indoor air into the indoor heat exchanger and exposing the heat-exchanged air to the room, a plurality of sensors (not shown), and a control means (not shown) for controlling the operation of the indoor units.

The indoor unit 20 includes an exhaust opening (not shown) for exhausting the heat-exchanged air, and the exhaust opening is provided with an air direction control means (not shown) for opening or closing the exhaust opening and controlling the direction of the exhausted air. The indoor unit controls intake air and exhausted air by controlling the rotation speed of the indoor unit fan, and also controls the amount of air. In some cases, the indoor unit may further include a human body sensing means for detecting a human presence in an indoor space. Moreover, the indoor units 21 and 22 each may further include an output part for displaying the operating condition and settings of the indoor unit 20, and an input part for inputting settings data.

The outdoor unit 10 operates in a cooling mode or a heating mode, in response to a request from the indoor units 21 and 22 connected to it or a control command from the remote controller, and supplies refrigerant to the connected indoor units 21 and 22.

The outdoor unit 10 may include at least one compressor (not shown) for compressing refrigerant and discharging high-pressure gaseous refrigerant, an accumulator (not shown) for separating gaseous refrigerant and liquid refrigerant from each other to prevent unevaporated liquid refrigerant from entering the compressor, an oil separator (not shown) for recovering oil from the refrigerant discharged from the compressor, an outdoor heat exchanger (not shown) for condensing or evaporating refrigerant by heat exchange with outside air, an outdoor unit fan (not shown) for drawing air into the outdoor heat exchanger and blowing out the heat-exchanged air, in order to facilitate the heat exchange by the outdoor heat exchanger, a four-way valve (not shown) for changing the flow passage of refrigerant depending on the operation mode of the outdoor unit, at least one pressure sensor (not shown) for measuring pressure, at least one temperature sensor (not shown) for measuring temperature, and control parts for controlling the operation of the outdoor unit and communicating with other units.

As shown in FIG. 1, the outdoor unit 10 may be equipped with a noise sensor 12. The outdoor unit 10 may detect the level of ambient noise based on noise data measured by the noise sensor 12, and controls operation according to the detected level of ambient noise. More particularly, the outdoor unit 10 distinguishes between noise generated by the outdoor unit itself and ambient noise, based on the noise measured by the noise sensor 12 when the outdoor unit is not operating, e.g., on standby, and the noise measured during the outdoor unit's operation, and performs low noise operation according to the noise measurements.

Generally, the most common causes of noise generated by the air conditioner result from the compressor and outdoor unit fan of the outdoor unit 10. The level of noise perceived in the room varies depending on the distance D between the outdoor unit 10 and the indoor space. Thus, the outdoor unit 10 controls operation by taking into account the perceived noise level which goes up or down depending on the placement distance.

Figure 3:
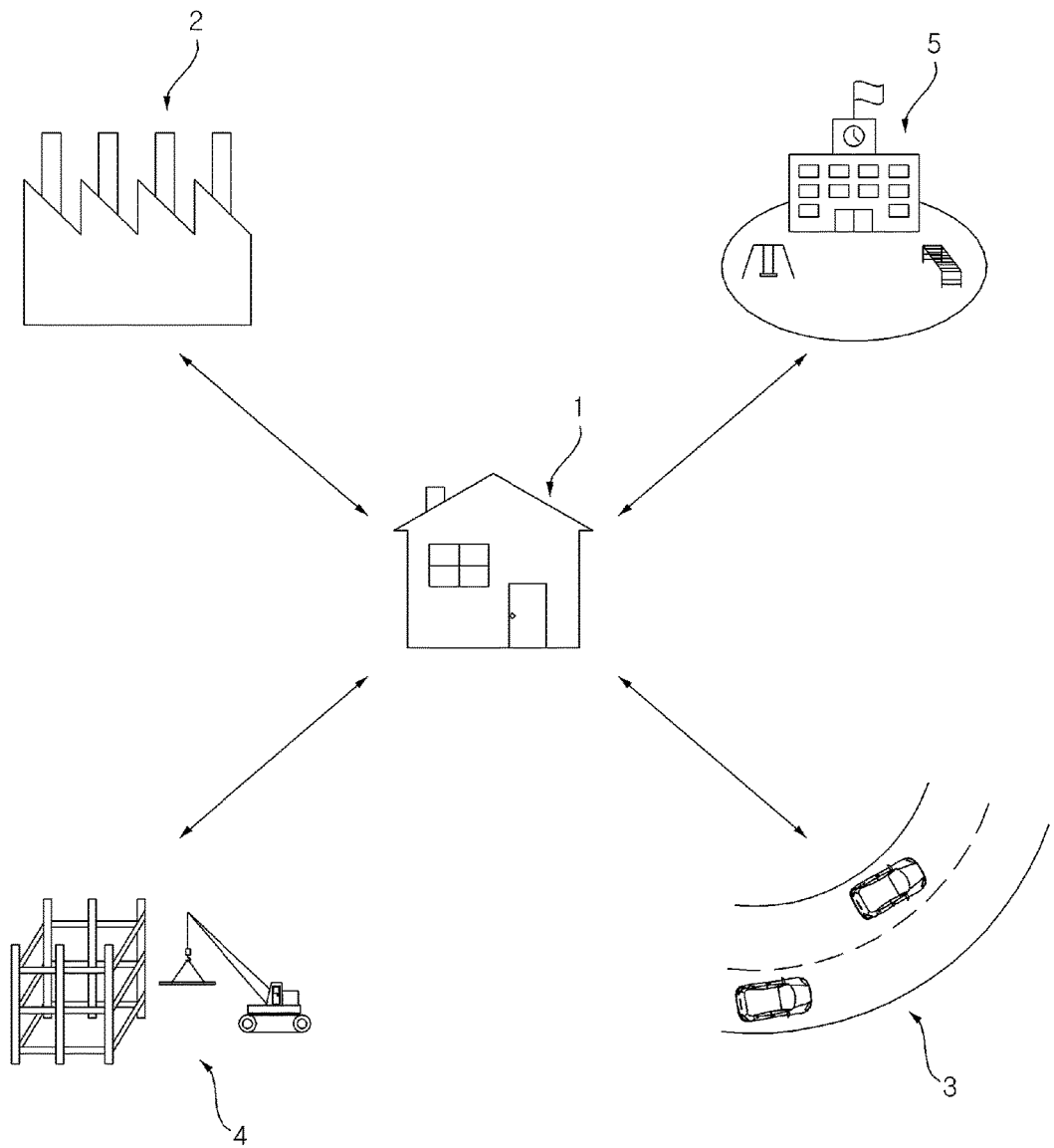
FIG. 3 is a view illustrating an example of the surroundings where an air conditioner according to the present disclosure is installed.

FIG. 3 is a view illustrating an example of common surroundings where an air conditioner according to the present disclosure may be installed. FIG. 3 illustrates an example of the surroundings where a person may perceive noise, in measuring ambient noise around a building 1 where the air conditioner is installed.

As illustrated in FIG. 3, in a case where a factory 2, a road 3, a construction site 4, and a school 5 are located near the building 1 where the air conditioner is installed, ambient noise may be generated.

For example, noise may be generated, particularly at lunchtime and school start and end times in the case of the school 5, during the hours of operation of the factory 2, during the construction at the construction site 4, and throughout the day in the case of the road 3.

The outdoor unit 10 measures ambient noise from the surroundings, as well as noise made by itself, by the noise sensor 12. The level of noise perceived in the building 1 varies with the distance from the building 1 to the plant 2, construction site 4, road 3, or school 5.

In such an environment that makes much ambient noise, the noise level requirement differs according to the surroundings even when the air conditioner performs a low noise operation.

That is, there is a difference between the noise level requirement for low noise operation in a residential area and the noise level requirement for low noise operation in an environment that makes much ambient noise. Thus, the air conditioner controls operation according to ambient noise.

Figure 4:
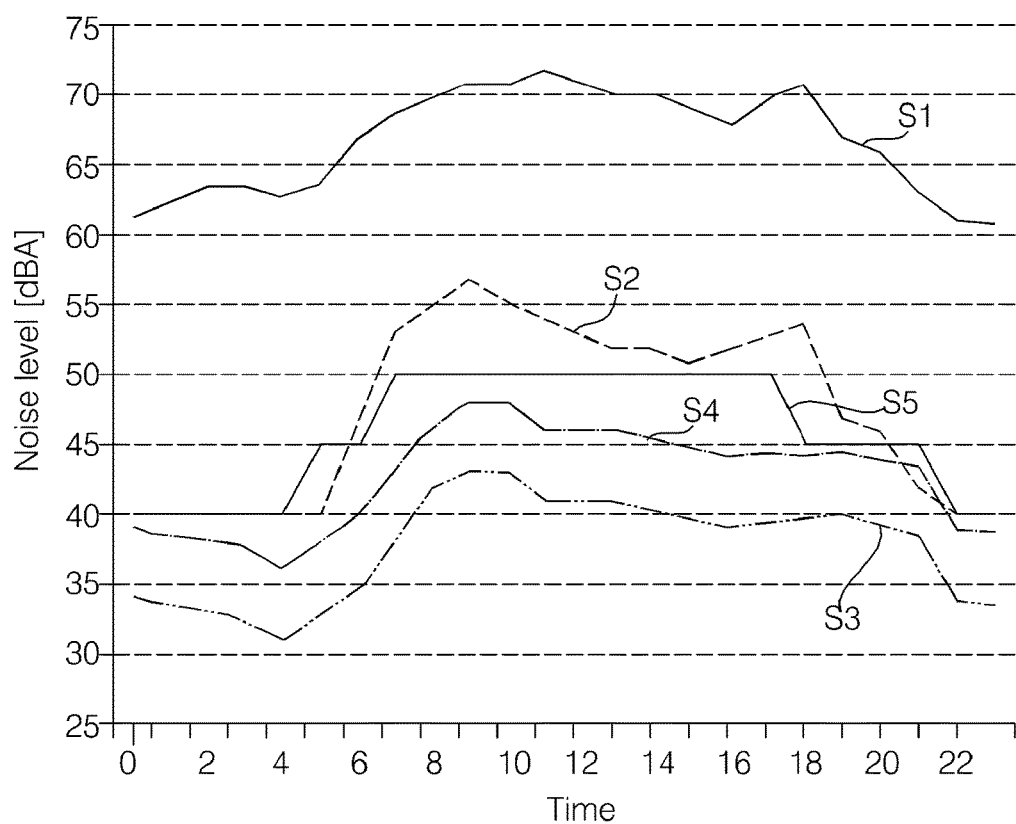
FIG. 4 is a noise measurement graph for an air conditioner according to the present disclosure.

FIG. 4 is a graph illustrating a noise measurement graph for an air conditioner according to the present disclosure. As illustrated in FIG. 4, the air conditioner controls operation in such a way that the target level of noise from the outdoor unit varies according to ambient noise.

More particularly, FIG. 4 is a graph illustrating the outdoor unit noise level S1, noise level S2 in general during control of the outdoor unit, ambient noise level S3, target noise level S4, and environmental noise regulatory value S5, which vary with time, according to an embodiment of the disclosure.

As illustrated, during operation of the outdoor unit, the outdoor unit noise level S1 is in the range from 60 dB to 73 dB. Since the outdoor unit 10 is installed outdoors a predetermined distance D away, as explained above, the noise level S2 during control of the outdoor unit is lower than the outdoor unit noise level 51. That is, the noise level S2 during control of the outdoor unit is dependent on the placement distance.

For example, if the outdoor unit 10 is installed 10 m away, the perceived noise level decreases by 20 dB (20*log 10[r=10 m]. Also, the perceived noise level further decreases during night-time. That is, the perceived noise level decreases by 20 dB+a relative to the outdoor unit noise level S1 during the night-time.

On the other hand, as illustrated in FIG. 4, the noise level S2 during control of the outdoor unit was higher than the environment noise regulatory value S5 during the daytime and evening hours. Thus, the user may perceive the noise as loud.

Accordingly, it is preferable that the air conditioner perform a low noise operation during the daytime and evening hours to ensure that the environmental noise regulatory value requirement is met S5.

When the air conditioner performs a low noise operation, ambient noise needs to be taken into account. As explained above, the noise level requirement in an environment with significant ambient noise is relatively low—that is, the user may feel less discomfort from noise from the outdoor unit in a loud environment. Thus, the operation of the air conditioner may be controlled by taking this into account.

The outdoor unit 10 measures ambient noise in real time by using the noise sensor 12, and controls operation by taking the level of ambient noise and the placement distance D into account. In this case, the target noise level S4 is set according to ambient noise by adding a predetermined value to the measured ambient noise level S3, and when the outdoor unit 10 is operating based on the target noise level, it may operate at a level lower than the environmental noise regulatory value S5. The added value may be changed depending on the level of ambient noise.

Accordingly, the outdoor unit 10 performs a low noise operation to reach the target noise level S4 that is set according to the measured ambient noise.

If two lower-capacity compressors are used, the outdoor unit 10 makes less noise while maintaining the same capacity and the same performance, as compared to using a single large-capacity compressor. Accordingly, the outdoor unit 10 can operate with less noise by controlling a plurality of compressors, while meeting the target capacity, thereby achieving low noise operation.

Figure 5:
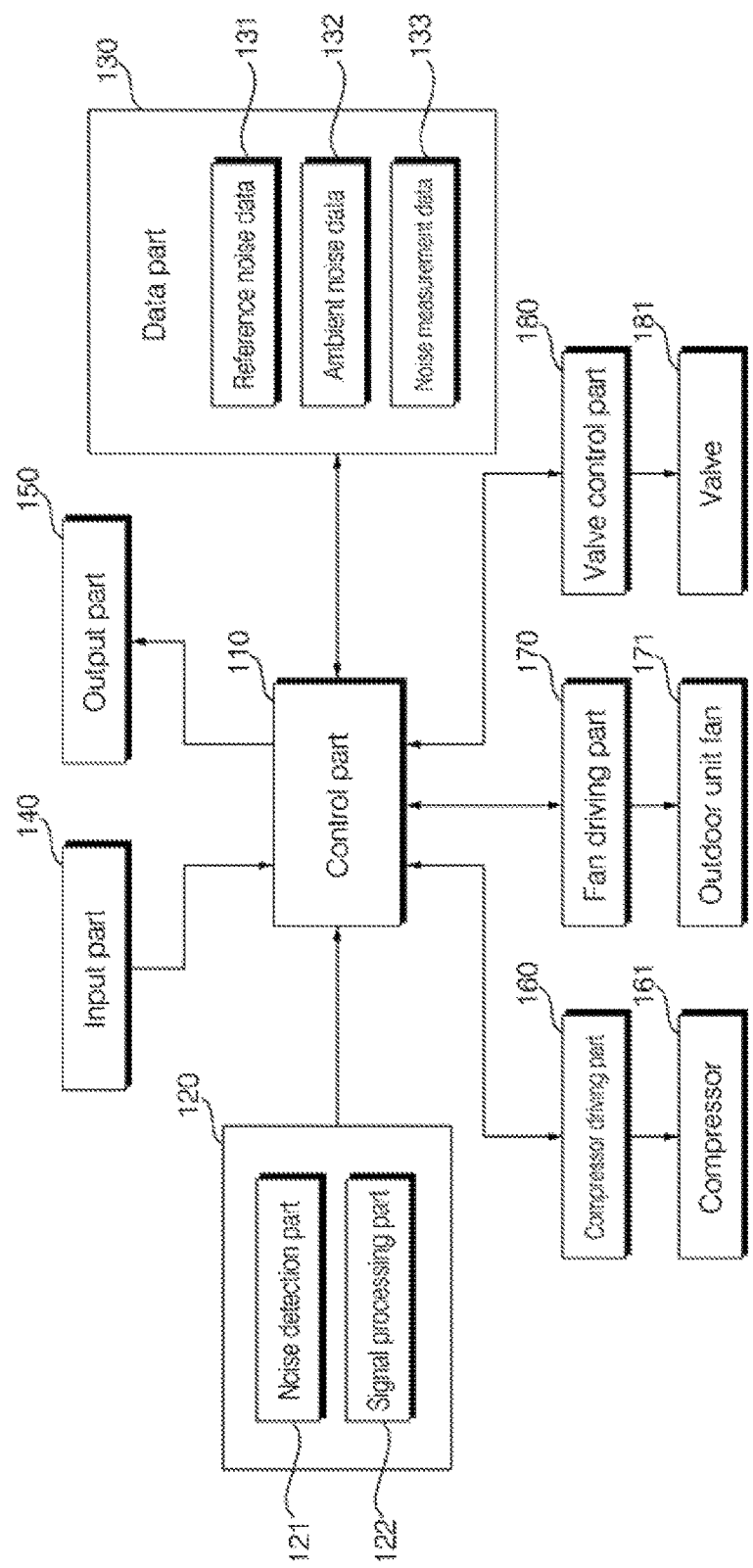
FIG. 5 is a view illustrating the control configuration of an air conditioner according to the present disclosure.

FIG. 5 is a view illustrating the control configuration of an air conditioner according to an embodiment of the present disclosure.

As illustrated, the outdoor unit 10 may include an input part 140, an output part 150, a noise sensor 120, a data part 130, a compressor driving part 160, a fan driving part 170, a valve control part 180, a compressor 161, an outdoor unit fan 171, a valve 181, and a control part 110 that controls the overall operation. The outdoor unit 10 may further include a plurality of sensors, such as a pressure sensor and a temperature sensor, a communication part, etc., in addition to the noise sensor, as control means for operation control, but description of them will be omitted below for purposes of convenience.

The input part 140 may include an input means, such as a button or a switch. The input part 140 applies data such as power input, an operation start command, a test operation command, an address setting command, etc. to the control part 110.

The output part 150 outputs the operating status of the outdoor unit. The output part 150 may include a display, a speaker, a buzzer, a lamp, etc. The output part 150 may indicate whether the outdoor unit is operating, produce a warning sound when something goes wrong, and show the operating status by the color or blinking of the lamp.

The noise sensor 120 may be installed inside or outside the outdoor unit 10. The noise sensor 120 measures noise and provides the measurement to the control part 110. The noise sensor 120 may operate in response to a control command from the control part 110. The noise sensor 120 may measure both noise generated while the outdoor unit 10 is stopped and noise generated during the operation of the outdoor unit 10, and provide the measurements to the control part 110. The control part 110 may also save the noise data provided by the noise sensor 120 in the data part 130, and accumulate the noise data over time.

The noise sensor 120 may measure noise in real time while the outdoor unit 10 is powered on, and provide the measurement to the control part 110.

As shown in FIG. 5, the noise sensor 120 may include a noise detection part 12 and a signal processing part 122. The noise detection part 121 may collect ambient sounds and provide them to the signal processing part 122, and the signal processing part 122 converts them to data and provide it to the control part 110.

The compressor 161 compresses incoming refrigerant to a high temperature, high-pressure and discharges it. The compressed refrigerant is circulated through the outdoor heat exchanger and the indoor heat exchanger and returns to the compressor. Here, for example, the indoor heat exchanger operates as an evaporator in cooling operation and as a condenser in heating operation. The outdoor heat exchanger operates as an evaporator when the indoor heat exchanger of the indoor unit operates as a condenser, and operates as a condenser when the indoor heat exchanger operates as an evaporator.

The compressor 161 may have a plurality of compressors—first and second compressors.

The compressor driving part 160 is a motor that may be provided to the compressor by a switching operation, which causes the compressor to operate by supplying operating power for operation control. The compressor driving part 160 may include an inverter (not shown) to make the compressor operate at a predetermined operating frequency.

The outdoor unit fan 171 may be equipped in the outdoor heat exchanger to blow out the air heat-exchanged by the outdoor heat exchanger. The outdoor unit fan 11 may be rotated by the fan driving part 170, and a plurality of outdoor unit fans 11 may be provided depending on the capacities of the compressor and outdoor heat exchanger.

The valve controller 180 may change the refrigerant's flow channel by opening or closing a four-way valve or expansion valve in response to a control command from the control part 110.

The data part 130 may save control data for operation of the outdoor unit and control of the components, data detected during the outdoor unit operation, and input/output data.

The data part 130 may also save noise measurement data 133 measured by the noise sensor 120, ambient noise data 132 measured by the noise sensor 120, and reference noise data 131 used for determining the level of noise.

For example, the noise data saved in the data part 130 may be accumulated and saved for a given period of time, and may be reset in response to a control command from the control part 110.

The control part 110 may configure the operational settings in response to a request from the indoor units 21 and 22 or the remote controller, perform a heating or cooling operation, and check the operating status based on data input from a plurality of sensors, and perform a control during the operation.

More particularly, for example, if the power of the outdoor unit 10 is ON, the control part 110 receives noise data from the noise sensor 120, and saves it as noise measurement data 133 in the data part 130. The control part 110 may save noise data according to time, on the basis of a time module (not shown).

The control part 110 may perform low noise operation based on noise data input from the noise sensor 120. As explained above, the control part 110 controls operation according to ambient noise to ensure that the noise from the air conditioner in the daytime does not exceed the environmental noise regulatory value. The control part 110 may detect abnormal noise from the noise data input from the noise sensor 120 and identify it as an error.

The control part 110 may distinguished between noise made by the outdoor unit and ambient noise and save the ambient noise as ambient noise data 132, based on differences in noise data input from the noise sensor 120 between while the outdoor unit is operating and while the outdoor unit is stopped.

For example, if noise is 40 dB while the outdoor unit is stopped, and noise is measured at 70 dB while the outdoor unit is operating, it means that ambient noise is 40 dB and the difference of 30 dB becomes the noise from the outdoor unit's operation. The noise level from the outdoor unit is kept constant as long as the operational settings of the outdoor unit are maintained without change. In other words, the measured noise level minus the outdoor unit noise level becomes the ambient noise level. The control part 110 may save the outdoor unit noise level separately, which depends on the operational settings of the outdoor unit, and detect changes in ambient noise by subtracting the outdoor unit noise level dependent on the operational settings from the measured noise level.

In this case, for example, when the compressor is not operating, the control part 110 may continuously measure ambient noise by the noise sensor 120 and accumulate and save ambient noise data. In some cases, the control part 110 may measure ambient noise separately for a given period of time or longer, and accumulate and save it. If the compressor keeps operating for a long period of time, the operation of the compressor may be stopped at predetermined time intervals to measure ambient noise.

The control part 110 may extract and save a pattern of changes in noise over time based on accumulated and saved noise data. The control part 110 analyzes the noise pattern at regular time intervals to create a noise history and controls operation based on the noise history. The control part 110 may analyze the noise pattern, especially for ambient noise.

For example, a time-dependent noise pattern for early morning, morning, afternoon, evening, and night may be analyzed. If there is a school 5 nearby, a noise pattern for school start and end times and lunchtime may be extracted. Also, if noise comes from a factory 4 in the daytime throughout the spring-to-fall season but not in the winter, this may be extracted as a pattern.

The control part 110 may control operation according to ambient noise by accumulating and saving noise data, and also may extract a noise pattern to create a noise history and use it for operation.

Moreover, the control part 110 may control the compressor driving part 160 to reduce noise in such a way that a plurality of compressors operate at a low operating frequency, rather than a single compressor that operates at a high operating frequency according to load.

Figure 6:
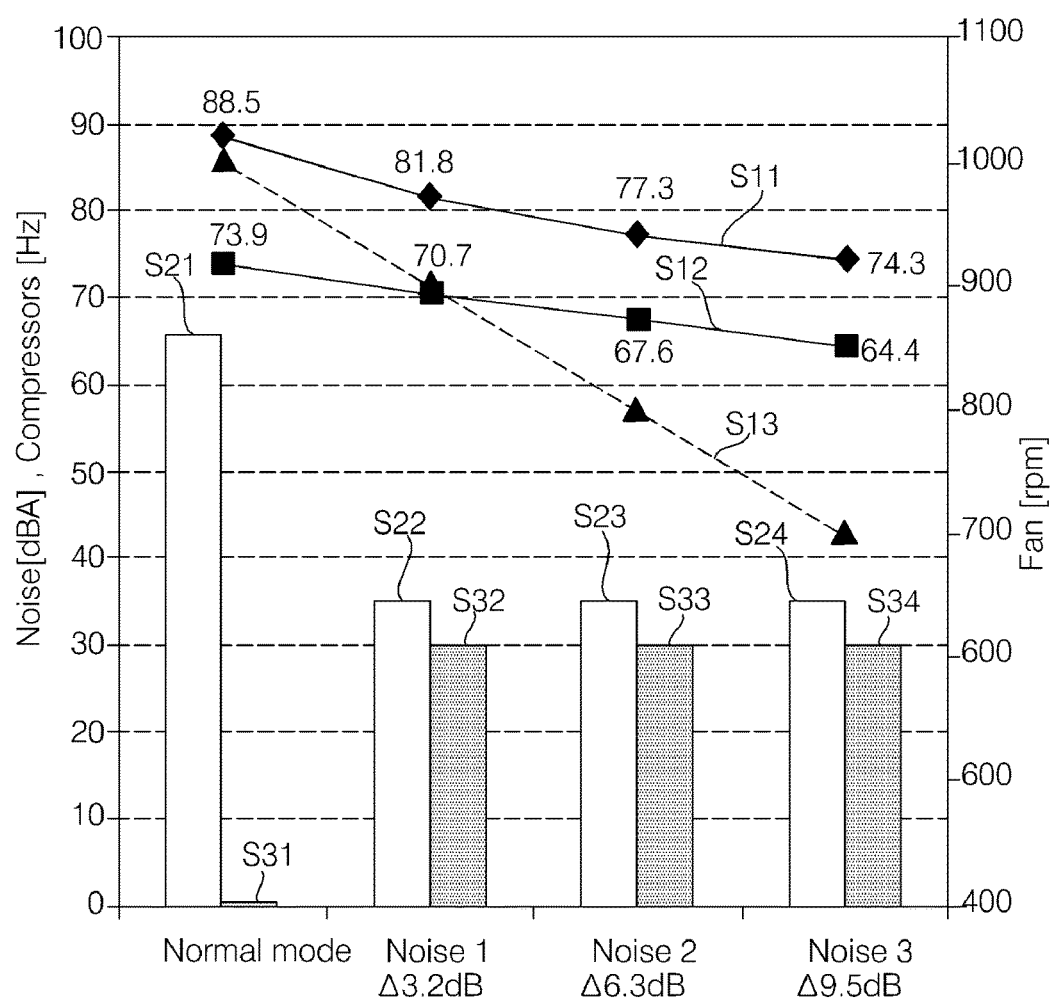
FIG. 6 is a graph illustrating the compressors' operating frequencies, fan's rotation speed, and changes in noise according to the operation mode of an air conditioner according to the present disclosure.

FIG. 6 is a graph illustrating the compressors' operating frequencies, fan's rotation speed, and changes in noise according to the operation mode of an air conditioner according to the present disclosure. More particularly, the noise level S11 is measured by the noise sensor. The noise level S12 is a perceived noise level perceived in the room. The noise level S13 relates to the rotation speed of the fan during operation. The noise levels are equivalent noise levels, measured in dBA.

As illustrated in FIG. 6, if the outdoor unit 10 is operating in Normal mode, only a single large-capacity compressor operates (S21) and the other compressor does not operate (S31). The compressor operates at 65 Hz, and the outdoor unit fan runs at about 1,000 rpm.

Accordingly, the noise level S11 measured by the noise sensor 120 is 88.5 dBA, and the perceived noise level S12 dependent on the placement distance is 73.9 dBA.

When the outdoor unit 10 performs low noise operation, it may run in Noise 1 mode, Noise 2 mode, and Noise 3 mode according to the level of low noise.

If the outdoor unit 10 performs low noise operation in Noise 1 mode, a plurality of compressors, e.g., first and second compressors, operate at 35 Hz and 30 Hz, respectively, and the outdoor unit fan runs at 900 rpm. In this case, the noise level S11 measured by the noise sensor 120 is 81.8 dBA, and the perceived noise level S12 is 70.7 dBA. Accordingly, the Noise 1 mode achieves a noise reduction of 3.2 dB compared to Normal mode.

If the outdoor unit 10 is operating in Noise 2 mode during low-noise operation, the first and second compressors operate at 35 Hz and 30 Hz, respectively, (S23) and (S33), and the outdoor unit fan runs at about 800 rpm. In this case, the noise level S11 measured by the noise sensor 120 is 77.3 dBA, and the perceived noise level S12 is 67.6 dBA. Accordingly, the Noise 2 mode achieves a noise reduction of 6.3 dB compared to Normal mode.

If the outdoor unit 10 is operating in Noise 3 mode during low-noise operation, the first and second compressors operate at 35 Hz and 30 Hz, respectively, (S24) and (S34), and the outdoor unit fan runs at about 700 rpm. In this case, the noise level S11 measured by the noise sensor 120 is 74.3 dBA, and the perceived noise level S12 is 64.4 dBA. Accordingly, the Noise 3 mode achieves a noise reduction of 9.5 dB compared to Normal mode.

For all of the Normal, Noise 1, Noise 2, and Noise 3 modes, the operating frequencies of the compressors were kept the same, and the rotation speed of the outdoor unit fan was controlled. Further noise reduction can be achieved if the operating frequencies of the compressors are controlled.

Accordingly, the outdoor unit 10 can operate with less noise but with similar performance, compared to Normal mode, by performing low noise operation with a plurality of compressors.

Preferably, for example, the operating frequencies of the compressors and the rotation speed of the outdoor unit fan are controlled within a range that the discharge temperature of the indoor units meets a target value. That is, in low noise operation, the control part 110 controls the operating frequencies of the compressors and the rotation speed of the outdoor unit fan within a range that does not significantly lower performance. The discharge temperature of the indoor units may be used as a criterion for performance assessment. If the inside temperature is higher than a target temperature when low noise operation is performed during cooling operation, the control part 110 may increase the operating frequencies of the compressors to further enhance performance.

Figure 7:
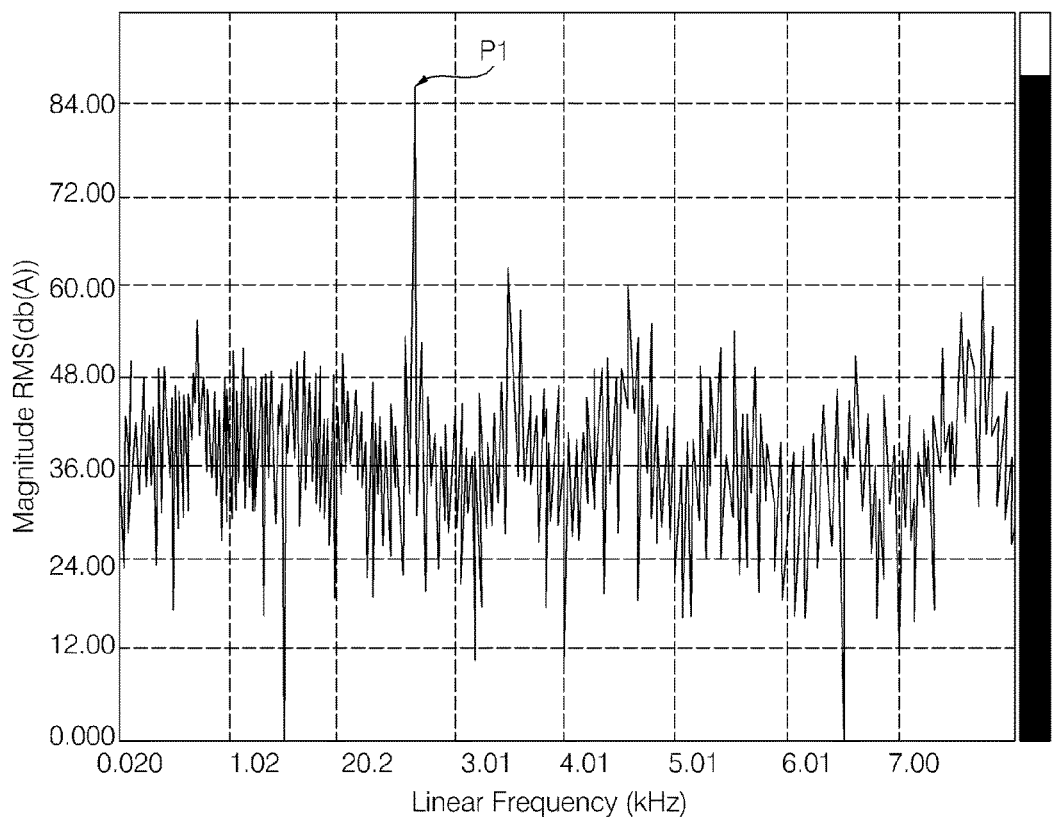
FIG. 7 is a view illustrating an example of abnormal noise from an air conditioner according to the present disclosure.

FIG. 7 is a view illustrating an example of abnormal noise from an air conditioner according to an embodiment of the present disclosure. As illustrated in FIG. 7, the outdoor unit 10 may sense an abnormal noise from noise measurements input from the noise sensor 120.

Noise measured by the noise sensor 120 may fluctuate depending on the operating status of the outdoor unit and ambient noise. Nevertheless, if an excessive noise level is measured as indicated at the first point P1 of FIG. 7, the control part 110 may identify it as abnormal noise.

Then, the control part 110 may check the operating status of the outdoor unit 10 and analyze the cause of this problem, and then output an error regarding the abnormal noise.

Such a noise is generated mainly from the compressor 161, outdoor unit fan 171, and valve (electronic expansion valve, EEV) 181 within the outdoor unit 10. Thus, the control part 110 may identify errors by changing the operating conditions of the compressor, fan, and valve.

For example, if the abnormal noise goes away by controlling the valve 181, the control part 110 may identify it as an abnormal noise generated from the valve or a noise caused by variation in the flow rate of refrigerant.

Figure 8:
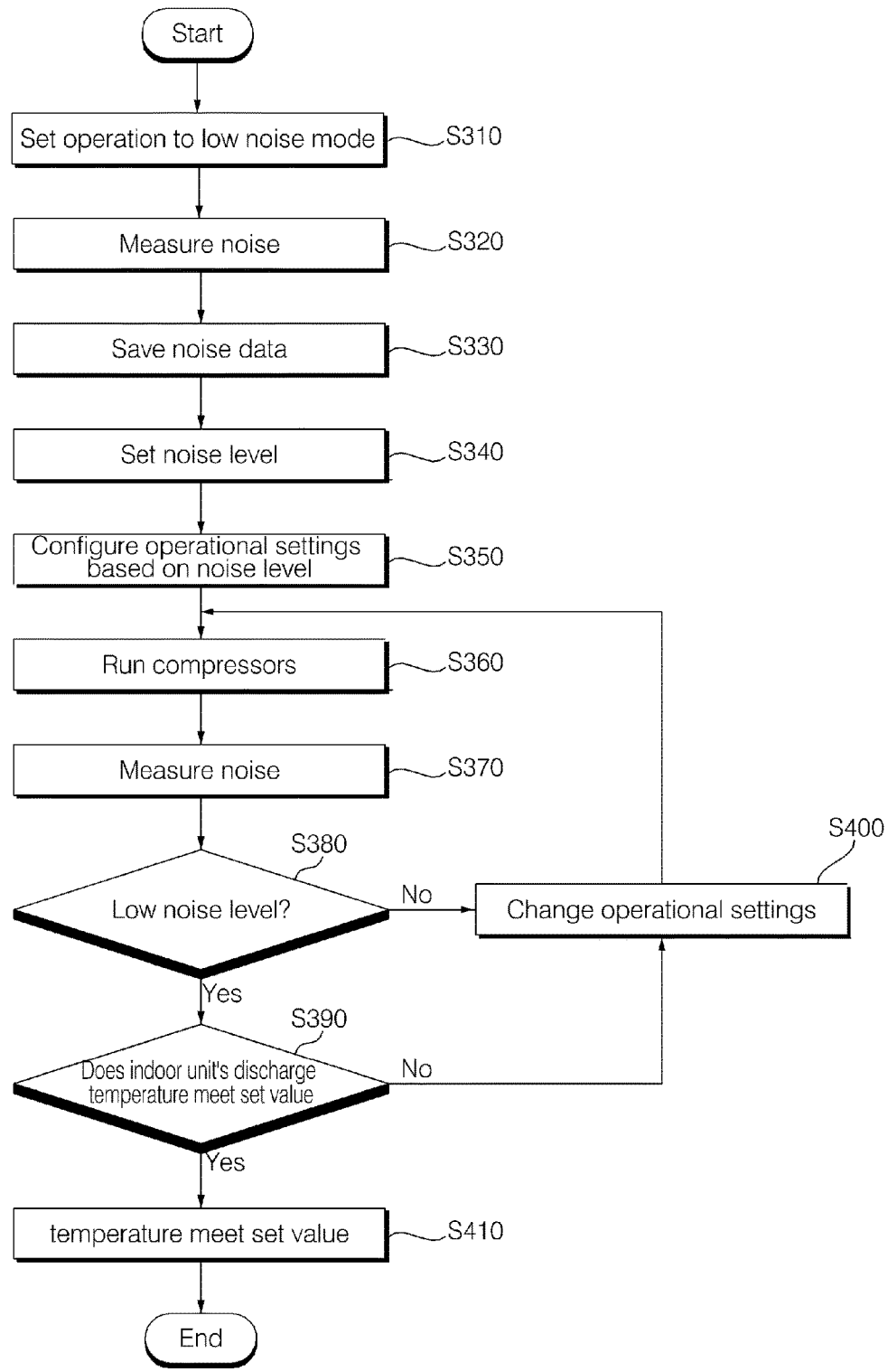
FIG. 8 is a flowchart illustrating a method of low noise operation for an air conditioner according to the present disclosure.

FIG. 8 is a flowchart illustrating a method of low noise operation for an air conditioner according to an embodiment of the present disclosure.

As illustrated in FIG. 8, the control part 110 sets the operation mode of the outdoor unit 10 to a low noise mode according to the operational settings (S310).

The noise sensor 120 measures noise (S320) and provides the measured noise data to the control part 110. If the power of the outdoor unit 10 is ON, the noise sensor 120 continues operating to measure noise.

The control part 110 saves noise data input from the noise sensor 120 in the data part 130 (S330).

The control part 110 sets the noise level according to the measured noise (S340), and configures the operational settings based on the noise level (S350).

For example, the control part 110 may determine the noise level according to the measured noise by taking ambient noise into account, and configure the operational settings such that the noise level is lower than the environmental noise regulatory value. For example, when a noise reduction of about 9 dB is needed, operation is performed in Noise 2 mode, and when a noise reduction of about 3 dB is needed, operation is performed in Noise 1 mode.

Moreover, the control part 110 may set the target noise level to a value obtained by adding 5 dB, 10 dB, 20 dB, or 30 dB to the ambient noise level and control operation to ensure that the target noise level is met. For example, the control part 110 may configure the operational settings by changing the rotation speed of the outdoor unit fan and the operating frequencies of the compressors according to the level of ambient noise.

For example, in order to perform operation in low noise mode 3 with an ambient noise level of 40 dB, the rotation speed of the outdoor unit fan may be set to 500 rpm and the operating frequencies of the compressors may be set to 40 Hz. In order to perform operation in the same low noise mode with an ambient noise level of 70 dB, the rotation speed of the outdoor unit fan may be set to 800 rpm and the operating frequencies of the compressors may be set to 70 Hz.

The control part 110 may control the compressor driving part 160, the fan driving part 170, and the valve control part 180 according to the operational settings.

Accordingly, the compressor driving part 160 sets the operating frequencies of the compressors to run the compressors 161 (S360), the fan driving part 170 causes the outdoor unit fan 171 to rotate, and the valve control part 180 adjusts the opening degree of the four-way valve or electronic expansion valve.

The noise sensor 120 continuously measures noise (S370).

The control part 110 determines whether the noise measured during the outdoor unit's operation is at a low level lower than an environmental noise regulatory value (S380).

If the noise measured during the outdoor unit's operation is at a low level, the control part 110 determines whether the discharge temperature of the indoor units meets a set value (S390).

If the noise measured during the outdoor unit's operation is not at a low level, or the measured noise is at a low level but the discharge temperature of the indoor units does not meet the set value, the control part 110 changes the operational settings (S400).

If the measured noise is not at a low level, the control part 110 controls the compressors 161 or the rotation speed of the outdoor unit fan 171 so as to further reduce the noise measured by the noise sensor 120.

Moreover, if the measured noise is at a low level but the discharge temperature of the indoor units is low and does not meet the set value, the control part 110 maintains the outdoor unit at the low level but increases the operating frequencies of the compressors or the rotation speed of the outdoor unit fan to ensure that the discharge temperature of the indoor units meets the set value. For example, the control part 110 may change the operational settings by adjusting the operating frequencies of the compressors in increments or decrements of 2 Hz up to a maximum of 10 Hz.

This process is repeated such that the control part 110 makes the compressors and the outdoor unit fan operate according to the changed settings, measures noise, determines whether the measured noise is at a low level, and determines whether the discharge temperature of the indoor units meets the set value (S360 through S400).

If the measured noise is at a low level and the discharge temperature of the indoor units is equal to or above a predetermined value—that is, if the set value is met, the current operational settings are maintained (S410).

For example, the control part 110 maintains the operation, but if the above requirements are not met because of a change in measured noise, the control part 110 may change the operational settings to ensure that both the low noise-level requirement and the indoor unit discharge temperature requirement are met.

Figure 9:
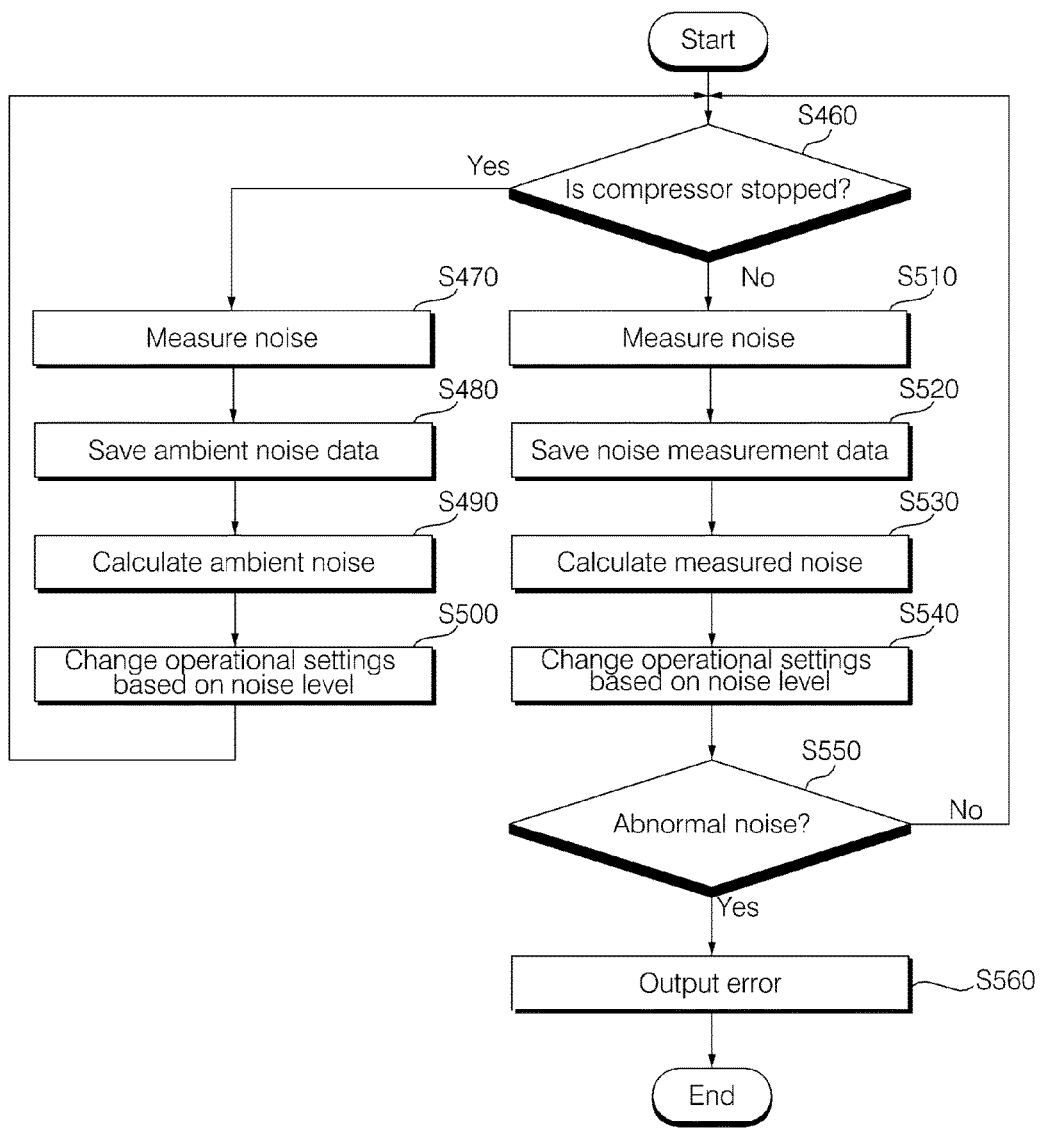
FIG. 9 is a flowchart illustrating a method of operating an air conditioner according to ambient noise according to the present disclosure.

FIG. 9 is a flowchart illustrating a method of operating an air conditioner according to ambient noise according to an embodiment of the present disclosure.

As illustrated in FIG. 9, the control part 110 measures noise by the noise sensor 120 according to whether the compressors 161 are in stopped state (S460) or not (S510).

The noise sensor 120 continuously measures noise while the outdoor unit 10 is powered ON. In this case, the control part 110 measures noise while the compressors are stopped, in order to measure noise made by the outdoor unit itself based on which the level of ambient noise can be detected. When the compressors are stopped, the outdoor unit fan is also stopped. If the compressors are stopped, the noise sensor 120 measures noise (S470), and the control part 110 saves the measured noise input from the noise sensor as ambient noise data in the data part 130.

The control part 110 calculates the level of ambient noise based on the ambient noise data (S490).

The control part 110 changes the operational settings based on the noise level (S500). As explained previously, if ambient noise is equal to or above a set value, the demand for low noise decreases, and therefore the operational settings are configured by taking the level of ambient noise into account.

The control part 110 may accumulate and save ambient noise data and analyze an ambient noise pattern based on the accumulated data to create a history of changes in ambient noise. The control part 110 performs a low noise operation after changing the operational settings based on the ambient noise pattern.

In some cases, if the compressors are operating for a predetermined period of time, the control part 110 may temporarily stop the compressors from operating in order to check for noise from the outdoor unit or ambient noise.

Meanwhile, the noise sensor 120 measures noise even when the compressors are operating (S510).

The control part 110 saves noise data input from the noise sensor as noise measurement data 133 in the data part 130 (S520).

The control part 110 calculates the level of measured noise (S530), and may change the operational settings by taking into account ambient noise, noise from the outdoor unit, and the placement distance, in order to ensure that the noise generated during the outdoor unit's operation does not exceed the environmental noise regulatory value (S540).

For example, the perceived noise level varies with the placement distance of the outdoor unit, and the louder the ambient noise, the lower the demand for low noise. With this taken into account, the control part 110 may control operation in such a way that a 20 dB reduction depending on the distance and a further 5 dB reduction depending on the ambient noise level—that is, a total of 25 dB reduction in the measured noise level from the outdoor unit—can be achieved.

Moreover, the control part 110 may set the target noise level based on the measured ambient noise level and control operation in such a way that noise from the outdoor unit varies according to a value obtained by adding 5 dB, 10 dB, 20 dB, or 30 dB to the ambient noise level.

Meanwhile, upon detecting an abnormal noise from noise measurements (S550), the control part 110 may output a warning (S560), and changes the operational settings and analyzes the cause of the abnormal noise to resolve the noise problem. If abnormal noise occurs repeatedly, the control part 110 may output a warning for inspection.

If the outdoor unit runs without abnormal noise, the control part 110 continuously changes the operational settings according to the measured noise level and maintains low noise operation to ensure that the noise from the outdoor unit does not exceed the environmental noise regulatory value.

Therefore, the present disclosure enables low noise operation to ensure that the noise from the air conditioner does not exceed a regulatory value by continuously measuring noise and controlling the operation based on the noise level, especially, the relative noise level according to ambient noise. Moreover, the present disclosure allows for dynamic operation control according to changes in noise by analyzing data on ambient noise.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner comprising:
   a compressor that compresses refrigerant;
   an outdoor unit fan that blows out heat-exchanged air by an outdoor heat exchanger;
   a noise sensor that measures noise;
   a data part that saves noise data measured by the noise sensor; and
   a control part that performs a low noise operation by distinguishing between ambient noise and noise made by the air conditioner based on noise measurements from the noise sensor,
   wherein the control part sets a target noise level according to the ambient noise, changes operational settings of the compressor and outdoor unit fan, and controls an operation mode to ensure that the noise from the air conditioner does not exceed an environmental noise regulatory value,
   wherein the control part changes the operation mode from a normal mode in which a single compressor operates at a high operating frequency to a low noise mode in which a plurality of compressors operate at a low operating frequency to reduce the measured noise.

2. The air conditioner of claim 1, wherein the control part controls the operation to ensure that a value obtained by subtracting a noise reduction depending on a placement distance of an outdoor unit with respect to the noise sensor from a measured noise level does not exceed the environmental noise regulatory value.

3. The air conditioner of claim 1, wherein the control part sets the target noise level to a value obtained by adding a predetermined value to an ambient noise level, whereby the predetermined value is based on the placement distance of an outdoor unit with respect to the noise sensor and a set low noise level.

4. The air conditioner of claim 3, wherein, the control part sets the target noise level to a value obtained by adding either 5 db, 10 db, 20 db, or 30 db to the ambient noise level when the air conditioner operates in the low noise mode.

5. The air conditioner of claim 1, wherein the control part changes the operational settings of the compressor and outdoor unit fan when the measured noise is not lower than the environmental noise regulatory value, or when the measured noise is lower than the environmental noise regulatory value but a discharge temperature of an indoor unit of the air conditioner does not meet the target noise level.

6. The air conditioner of claim 1, wherein the noise sensor continuously measures noise and provides noise data to the control part.

7. The air conditioner of claim 1, wherein the control part detects noise measured by the noise sensor as ambient noise when the compressor is stopped.

8. The air conditioner of claim 1, wherein the control part saves the ambient noise as ambient noise data in the data part, extracts a noise pattern for the ambient noise by analyzing the ambient noise data, and controls the operational settings of the compressor and outdoor unit fan based on the noise pattern for the ambient noise.

9. The air conditioner of claim 1, wherein, when the compressor has been operating for a predetermined period of time, the control part stops the compressor from operating and then detects the noise measured by the noise sensor as ambient noise.

10. The air conditioner of claim 1, wherein the control part detects whether there is an abnormal noise from the noise measurements and, when an abnormal noise is detected, the control part changes the operational settings of at least one of the compressor, the outdoor unit fan, or a valve.

11. The air conditioner of claim 10, wherein, when an abnormal noise is detected, the control part outputs an error to an output part.

12. A method of operating an air conditioner having an indoor unit and an outdoor unit, the method comprising:
    measuring, by a noise sensor, noise when an operation mode of the outdoor unit is set to a low noise mode;
    detecting, by a control part, ambient noise from the measured noise and setting a target noise level according to the ambient noise;
    configuring, by the control part, operational settings of a compressor or an outdoor unit fan based on the target noise level;
    measuring, by the noise sensor, noise during operation of the outdoor unit after the operational settings of the compressor or the outdoor unit fan have been configured;
    determining, by the control part, whether the measured noise is at a low level lower than an environmental noise regulatory value;
    determining, by the control part, whether a discharge temperature of an indoor unit meets a set value; and
    changing, by the control part, the operational settings of the compressor or the outdoor unit fan when the noise from the outdoor unit is not at a low level or the discharge temperature of the indoor unit does not meet the set value, and
    wherein, by the control part, when the operation mode is changed from a normal mode in which a single compressor operates at a high operating frequency, to the low noise mode in which the operational settings of the compressor is changed for a plurality of compressors to operate at a low operating frequency for reducing the measured noise.

13. The method of claim 12, wherein, when the noise from the outdoor unit is less than the environmental noise regulatory value, the noise is detected as a low-level noise, and the noise from the outdoor unit has a value obtained by subtracting a noise reduction depending on the distance from a measured noise level with respect to the noise sensor.

14. The method of claim 12, wherein the noise measured by the noise sensor is detected as ambient noise when the compressor is stopped, and saved as ambient noise data.

15. The method of claim 12, further comprising, when the compressor has been operating for a predetermined period of time, stopping the compressor from operating and then measuring ambient noise by the noise sensor.

16. The method of claim 12, further comprising:
    setting, by the control part, the target noise level to a value obtained by adding either 5 db, 10 db, 20 db, or 30 db to the ambient noise level when the outside unit is operating in the low noise mode.

17. The method of claim 12, further comprising:
    detecting, by the control part, the measured noise as an abnormal noise and outputting an error when the level of the measured noise is greater than or equal to a predetermined value.

18. The method of claim 17, further comprising:
changing, by the control part, the operational settings of at least one of the compressor, the outdoor unit fan, or a valve, and analyzing the cause of an abnormal noise.

* * * * *